May 7, 1940.   H. KATTWINKEL   2,199,801
MULTIPLE DISK FRICTION DEVICE
Filed April 11, 1938    2 Sheets-Sheet 1

Inventor:
H. Kattwinkel
by
Glascock Downing & Seebold
Attys.

May 7, 1940.  H. KATTWINKEL  2,199,801
MULTIPLE DISK FRICTION DEVICE
Filed April 11, 1938   2 Sheets-Sheet 2

Inventor:
H. Kattwinkel
by
Glascock Downing & Seebohm
Attys.

Patented May 7, 1940

2,199,801

UNITED STATES PATENT OFFICE 2,199,801

MULTIPLE DISK FRICTION DEVICE

Hans Kattwinkel, Radebeul, Germany

Application April 11, 1938, Serial No. 201,462
In Germany April 12, 1937

14 Claims. (Cl. 192—69)

The known friction clutches of the multiple disk type especially of automobile vehicles frequently give rise to a disagreeable noise, which is to be attributed to the continually varying impacts of the driving teeth of the clutch disks against the adjacent flanks of the guiding ledges of the disk carriers when the direction of the force changes rapidly, as occurs for instance in consequence of torsional oscillations in the engine shaft, or when traversing badly paved roads. The clearance provided from the outset between the driving teeth and the guiding ledges, for the purpose of obviating jamming when the temperature fluctuates, increases in the course of time in consequence of the continual change of the impact from one side to the other, and consequently the noise occasioned thereby becomes continually louder, so that it may become a serious nuisance, particularly in passenger vehicles.

According to my present invention this disadvantage is obviated by allowing only single clutch disks of the group pertaining to one or the other of the shafts to be coupled together, preferably the two end disks, or even only one of them, to come directly into engagement with the carrier thereof, while the connection of the other disks with their carrier is effected through the medium of intermediate members, which are yielding in the axial direction but are resistant in the peripheral direction, these intermediate members preferably consisting of annular disks or sectors of annular disks of thin spring sheet metal, which are secured to one another by their inner margins, whereas by their outer margins they are secured to the clutch laminations, by welding, riveting or the like.

Further features and advantages of my invention will be gathered from the following description and claims.

My invention is illustrated by way of example in the accompanying drawings, in which.

Figure 1:
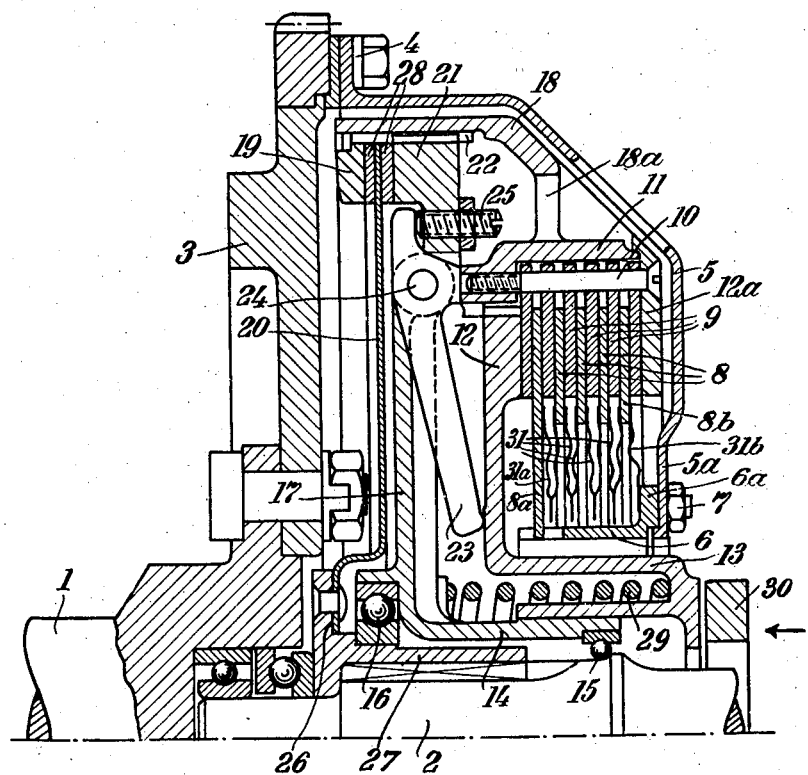
Figure 1 shows an axial section through the upper portion of an automobile clutch.

In Figure 1, I denotes the engine shaft, and 2 the shaft to be driven through the clutch. To a fly-wheel 3, flanged to the shaft 1, is secured at 4 by means of screws a pot-shaped casing 5, with the right hand flange member 5a of which is connected by means of screws 7 a sleeve 6, which is concentric with the shaft. The sleeve 6 serves as a driving member for the group of friction disks 8 belonging to the shaft 1. The disks 9 of the group belonging to the shaft 2 are aligned upon bolts 10, which are screwed into an annular body 11, which forms the carrier for the group of discs 9. The bolts 10 hold at the same time the annular disks 12a, which serves as an abutment for pressing together the packet of friction disks 8, 9. These disks are pressed together by the aid of a pressure plate 12, which is slidable in an axial direction, with a hub body 13 constructed as a hollow sleeve, upon a hub sleeve 14. To the sleeve 14, which is supported by the aid of ball bearings 15 and 16 upon the driven shaft 2, is connected a disk 17, which is integral with the annular body 11. The annular body 11 forms towards the fly-wheel 3 a bell-shaped extension 18, which, on the side facing the fly-wheel, has an inwardly projecting flange 19. The latter serves as an abutment for the friction disk 20 of an auxiliary clutch. The pressure plate 21 of the auxiliary clutch forms a ring, which is guided on ledges 22 of the body 18, and which is pressed against the friction disk 20 by means of helical springs, not shown in the drawing, which are located between it and the flange member 18a of the bell body 18.

The release of the auxiliary clutch is effected by the aid of levers 23, which are distributed round the periphery, and which are pivoted at 24 to the annular body 11. The levers lie with their lower ends at a short distance opposite the pressure plate 12 of the main clutch, and bear with their shorter outer ends against adjusting screws 25 in the pressure ring 21 of the auxiliary clutch.

In the embodiment illustrated it is assumed that the outer disks 9 consist of frictional material, such as an asbestos material impregnated with an artificial resin, while the inner disks 8 consist of sheet metal, preferably sheet steel, of a thickness of about 2 millimetres. Now the disks 8 are not guided in the usual manner on the sleeve 6 serving as their carrier, but instead of this in the case represented only two of these disks, namely the two end ones, are directly connected with the sleeve 6, the end disk 8a facing the fly-wheel being guided in the usual manner on the sleeve 6 by the aid of teeth engaging in axially directed notches in the sleeve, while the other end disk 8b is connected with the flange member 6a of the sleeve by an annular disk 31b of very thin spring sheet metal, having a thickness for instance of 0.3 millimetre. In a similar manner the remaining disks 8 are connected with one another and with the other end disks. The annular disks 31, which connect the inner disks with one another, are arranged in pairs and are connected with one another in pairs by their inner margins. The connection of the annular disks 31, 31a and 31b with one another, and with the clutch disks or with the flange 6a as the case may be, is preferably effected by welding or riveting. It is advisable to provide the annular disks with concentric corrugations as indicated in the drawing, for the purpose of increasing their flexibility in relation to the displacements in an axial direction.

The guiding of one end clutch disk, for instance the left-hand end disk 8a, on the sleeve 6, in such a manner that a transmission of the peripheral force between the two members takes place, might even be omitted.

Instead of or in addition to the disk 8 pertaining to the driving shaft 1, the disk 9 of the other group, which pertains to the driven shaft, might of course also be connected with their carrier in the manner described, according to which of the two groups consists of disks that might give rise to noise by direct engagement with their carrier.

Figure 3:
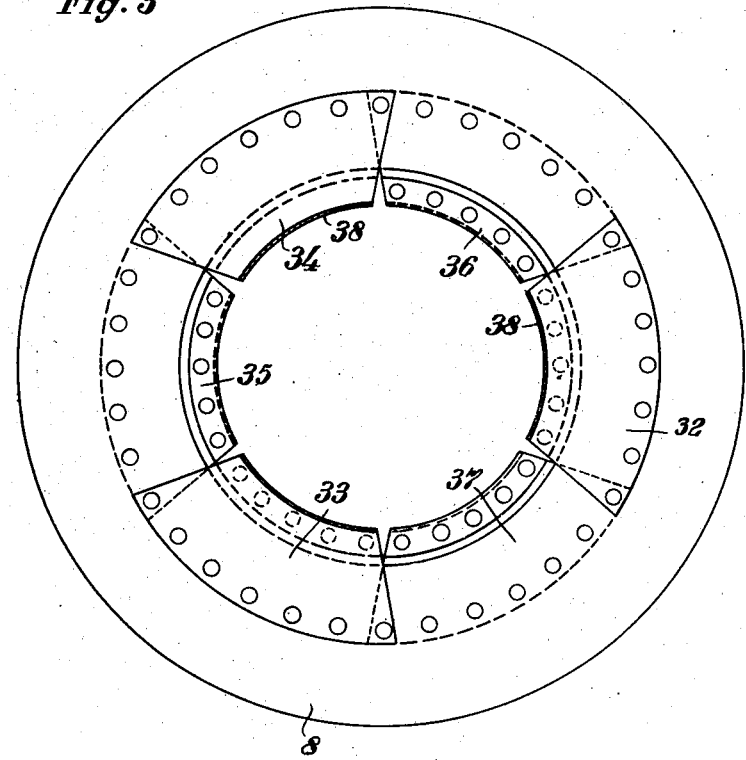
Figure 3 shows this connection in section on the line A—B in Figure 2.
Figure 2:
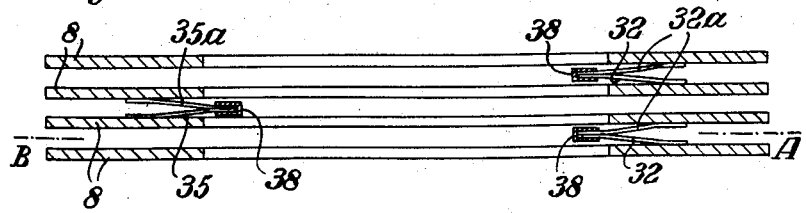
Figure 2 shows in axial section on a larger scale another form of construction of the connection between the frictional disks.

Instead of annular discs which are continuous round the periphery there may be employed, as illustrated in Figures 2 and 3, as the yielding intermediate members, individual pieces of spring sheet metal, which are preferably in the form of sectors of annular disks. In the case illustrated, four frictional disks 8 are provided, these being in the form of continuous annular disks of sheet steel, gray cast iron or the like. Each two adjacent disks are connected with one another by six sectors of annular disks of resilient sheet metal, there being provided, apart from the end clutch disks, upon each side of each disk, three such ring sectors, 32, 33 and 34 on one side, and 35, 36 and 37 on the other side. The arrangement is illustrated in detail in Figure 3. This figure shows that the annular sectors 32, 33, 34 of one group are uniformly distributed over the disk 8 in question, the spaces between them being about equal to their peripheral extent, and that the annular sectors 35, 36 and 37 provided upon the other side of the disk, are in staggered relationship to the first group. The annular sectors are connected with the disks 8 and with one another, preferably by spot welding. The connection of each two adjacent annular sectors 32, 32a, 33, 33a and 34, 34a, also 35, 35a, 36, 36a and 37, 37a (Figure 2) is preferably effected by the aid of shoes consisting of suitably shaped sheet-metal channels 38, which are welded to the inner margins of the associated sectors.

The two outer clutch disks, or at least one of them, as in the case of the form of construction described above, may likewise be connected by means of individual annular sectors with the associated clutch disk carrier or driving body. It is, however, also possible to allow one of the end disks to come directly into engagement with the driving body in the manner hitherto usual.

In the embodiment illustrated in Figures 2 and 3, it is assumed that this is a group of inner clutch disks, that is to say, disks that co-operate with an internally located carrier or driving body. The invention is however of course also applicable to disks co-operating with an outer driving body. In Figure 2, for the sake of simplicity, only those of the annular sectors that are in section are shown. In general the disks 8 consist of sheet steel or of gray cast iron, of a thickness of from 2 to 3 millimetres, while the intermediate members or diphragms 31 consist of sheet steel of a thickness of for instance 0.3 millimetre.

It may also be mentioned that in the case of the first form of construction described the torque from the two end disks is distributed to the packet of disks, so that the two end diaphragms 31a and 31b each have to transmit half the torque. Towards the middle the magnitude of the torque diminishes to an extent corresponding to the number of friction disks.

Apart from the advantage hereinbefore mentioned the result is also obtained, owing to my new construction of the clutch, that when the clutch is opened, owing to the resilience of the diaphragms 31, a certain amount of clearance is automatically produced between the frictional disks, and that furthermore, when the clutch is closed, or when the disks are displaced in an axial direction, an appreciable loss of power no longer occurs, because the friction against the guiding ledges of the disk carriers is absent. When the disks become worn, they can moreover pass over into the new position without tilting and without consuming power.

A further advantage resides in the convenient assembling and separating of the packet of friction disks. All that is necessary is to release the screws 4 and 7, and then, after withdrawing the cover 5, which immediately becomes possible, to release the screws 10, thus enabling the packet of disks to be taken out as a whole. In this way the packet of disks after becoming worn can readily be replaced by a fresh packet. The disks that have become useless may be thrown away at once, since the manufacture according to this invention is very cheap. The faults or injuries hitherto constantly occurring owing to erroneous riveting of the frictional coverings to the disks and owing to wrongly employed frictional material and co-operating material, as well as owing to bad fitting of the disks into the associated driving body, and above all owing to remounting of steel disks that have already become grooved, are thereby obviated. For the repair of the clutch, therefore, a finished insertion piece is supplied by a special firm, consisting of the disk carrier 6, 6a, together with the disks 8 rigidly connected with it and with one another by intermediate members 31, 31a and 31b.

The construction of the thin annular disks or diaphragms connecting the friction disks with their carriers or driving bodies with concentric corrugations also presents the advantage, in addition to the ampler resilience, that it precludes distortion of the frictional disks into a conical form, such as occurs with friction disks consisting of plane spring sheet metal upon axial displacement of the latter in relation to their carrier.

My invention is of course not limited to the construction or employment of the frictional disks in clutches. It may also be employed with advantage in frictional disks for brakes and other machine parts. The annular sectors may of course be connected with the disks and with one another not only by welding but also in other ways, for instance by riveting.

What I claim is:

1. In a multiple disk friction device, more particularly for automobile vehicles, comprising two parts rotatable relatively to each other and adapted to be stopped relatively to each other by means of friction; two sets of friction disks, each of said sets comprising a plurality of friction disks, one of said sets being associated to one of the parts of said device, the other one of said sets being associated to the other part of said device, a disk carrier for each of said sets, some friction disks of at least one of said sets being directly connected with their carrier, the remaining friction disks being connected through the medium of intermediate means, which are yielding in an axial direction but are practically unyielding in the peripheral direction, to the friction disks directly connected with their carrier.

2. A multiple disk friction device as claimed in claim 1, comprising a packet of friction disks composed alternately of disks of the one and of the other set, characterised by the feature, that only one of the end disks of one of the sets forming said packet is directly connected with its appertaining carrier.

3. A multiple disk friction device as claimed in claim 1, comprising a packet of friction disks composed alternately of disks of the one and of the other set, characterised by the feature, that only the two end disks of one of the sets forming said packet are directly connected with their appertaining carriers.

4. A multiple disk friction device as claimed in claim 1, characterised by the feature, that said intermediate means are resiliently yielding in an axial direction.

5. In a multiple disk friction device, more particularly for automobile vehicles, comprising two parts rotatable relatively to each other and adapted to be stopped relatively to each other by means of friction: two sets of friction disks, each of said sets comprising a plurality of friction disks, one of said sets being associated to one of the parts of said device, the other one of said sets being associated to the other part of said device, a disk carrier for each of said sets, some friction disks of at least one of said sets being directly connected with their carrier, the remaining friction disks being connected through the medium of intermediate means, which are yielding in an axial direction but are practically unyielding in the peripheral direction, to their appertaining carrier.

6. A multiple disk friction device as claimed in claim 1, said intermediate means comprising annular disk members of thin spring sheet metal, which are fixedly connected by one peripheral margin to their friction disks and by the other peripheral margin to one another.

7. A multiple disk friction device as claimed in claim 1, said intermediate means comprising annular disk members of thin spring sheet metal, some of which are fixedly connected by one peripheral margin to their friction disks and by the other peripheral margin to one another, one of said annular disk members having its margin connected to its appertaining carrier.

8. A multiple disk friction device as claimed in claim 1, characterised by the feature, that said intermediate means are connected to their friction disks and to each other by spot welding.

9. A multiple disk friction device as claimed in claim 1, characterised by the feature, that one of the end disks is connected with its carrier by resilient annular disk members, while the other end disk engages with its carrier in the usual manner by sliding in a guide, the connection of said other end disk with the next disk of its set being effected by a pair of annular spring disk members.

10. In a multiple disk friction device, more particularly for automobile vehicles, comprising two parts rotatable relatively to each other and adapted to be stopped relatively to each other by means of friction: two sets of friction disks, each of said sets comprising a plurality of friction disks, one of said sets being associated to one of the parts of said device, the other one of said sets being associated to the other part of said device, a disk carrier for each of said sets, some friction disks of at least one of said sets being directly connected with their carrier, the remaining friction disks being connected through the medium of intermediate means, which are yielding in an axial direction but are practically unyielding in the peripheral direction, to the friction disks directly connected with their carrier, at least one of said intermediate means comprising a plurality of individual pieces of spring sheet metal.

11. A multiple disk friction device as claimed in claim 10, characterised by the feature, that said individual pieces of sheet metal have the form of a sector of an annulus and are distributed at equal distances round the periphery.

12. A multiple disk friction device as claimed in claim 10, characterised by the feature, that each two adjacent disks are connected with one another by means of pieces of sheet metal connected with one another in pairs and distributed in spaced relationship round the periphery, the pieces of sheet metal pertaining to one pair of disks being in staggered relationship to those pertaining to the neighbouring pair of disks.

13. A multiple disk friction device as claimed in claim 10, characterised by the feature, that said pieces of spring sheet metal are connected with one another on their free peripheral margins through the medium of sheet-metal channels.

14. A multiple disk friction device as claimed in claim 10, characterised by the feature, that said pieces of spring sheet metal are connected with one another on their free peripheral margins through the medium of sheet-metal channels by spot welding.

HANS KATTWINKEL.